(12) United States Patent
Wang et al.

(10) Patent No.: US 7,718,917 B2
(45) Date of Patent: May 18, 2010

(54) HYBRID LASER AND RESISTANCE WELDING SYSTEM AND METHOD

(75) Inventors: Pei-Chung Wang, Troy, MI (US); Xihua Zhao, Jilin (CN); He Zhao, Jilin (CN)

(73) Assignees: GM Global Technology Operations, Inc., Detroit, MI (US); Jilin University, Changchun (CN)

( * ) Notice: Subject to any disclaimer, the term of this patent is extended or adjusted under 35 U.S.C. 154(b) by 0 days.

(21) Appl. No.: 11/178,097

(22) Filed: Jul. 8, 2005

(65) Prior Publication Data

US 2007/0007254 A1    Jan. 11, 2007

(51) Int. Cl.
*B23K 11/06* (2006.01)
*B23K 11/10* (2006.01)
*B23K 26/00* (2006.01)

(52) U.S. Cl. .................. 219/91.2; 219/83; 219/121.64; 219/81; 219/121.63; 219/86.9

(58) Field of Classification Search .................. 219/83, 219/105, 170, 81, 82, 121.63, 121.64, 86.9, 219/91.2
See application file for complete search history.

(56) References Cited

U.S. PATENT DOCUMENTS

| | | | |
|---|---|---|---|
| 4,899,030 A | 2/1990 | Miyazaki et al. | 219/121.63 |
| 5,216,220 A | 6/1993 | Davis et al. | |
| 5,343,010 A * | 8/1994 | Urech | 219/83 |
| 5,389,761 A * | 2/1995 | Kresse, Jr. | 219/78.14 |
| 5,821,493 A * | 10/1998 | Beyer et al. | 219/121.46 |
| 5,968,380 A | 10/1999 | Hayashi et al. | 219/121.64 |
| 6,545,244 B1 * | 4/2003 | Gould et al. | 219/118 |
| 6,583,377 B2 * | 6/2003 | Zehavi et al. | 219/121.46 |
| 6,608,285 B2 * | 8/2003 | Lefebvre et al. | 219/137 R |

FOREIGN PATENT DOCUMENTS

| | | |
|---|---|---|
| EP | 1629927 | 3/2006 |
| JP | 60 118398 | 6/1985 |
| JP | 04 084685 | 3/1992 |
| JP | 07 266069 | 10/1995 |

OTHER PUBLICATIONS

International Search Report for PCT/US06/24300 dated Jan 5, 2007 corresponding to this application.

* cited by examiner

*Primary Examiner*—Kevin P Kerns

(57) ABSTRACT

An improved fusion welding system having a heating unit and welding device is adapted for increasing the efficiency of welding a plurality of workpieces. The system preferably presents a single-sided process, and includes first and second electrode wheels operable to heat a portion of the workpieces to a minimum temperature, and a translatable laser cooperatively configured to form a continuous weld within the heated portion. The preferred system provides the advantages of laser welding, such as precision, while enabling weld production at lower laser power outputs or faster welding speeds than conventional laser welding systems.

13 Claims, 2 Drawing Sheets

Resistance Heat-Assisted Laser Welding

HYBRID LASER AND RESISTANCE WELDING SYSTEM AND METHOD

BACKGROUND OF THE INVENTION

1. Field of the Invention

The present invention relates to welding systems, and more particularly to a fusion welding system including a heating unit and welding device for combination heating and welding.

2. Discussion of Prior Art

The process of material joining and treatment is a necessary condition for the industrial progress. As such, fusion-welding systems have been developed for joining multi-component workpieces. One such system, laser spot and seam welding utilizes laser heat energy during joining, and is commonly used, for example, in the automotive industry.

These conventional systems are typically used to provide faster welding speeds and produce more accurate and precise welds than do counterpart resistance welding technologies. The power associated with the laser, and the material composition and initial state of the workpieces are directly proportional to the aspect ratio of weld depth to width. In other words, the more powerful the laser and focused the beam, the greater the heat energy density. However, while these benefits help minimize stresses experienced by the workpieces, they present other concerns. For example, these systems are typically limited by strict requirements of tolerance, porosity formation, poor gap bridgeability and hot cracking in the weld. Of further concern are the relative high costs associated with high-powered lasers (i.e., lasers having a power output greater than 4 kW), which are not solely a result of increased input energy demands.

These systems may also present construction concerns, where a high-powered laser is utilized to produce the fusion weld. The rapid change in temperature from initial room temperatures to temperatures greater than the melting range of the material, coupled with the speed of weld formation contribute to the production of pores formed by trapped gas, and cracking within the relatively narrow weld. The formation of pores and cracking further reduces the structural integrity of the weld.

Other welding systems, such as conventional hybrid laser-arc systems that feature the simultaneous application of heat generated from laser radiation and an electric arc, have also been developed. As with conventional laser welding, these hybrid systems often require high powered laser output for, and therefore, experience the same concerns during combination welding.

Thus, there is need in the art for an improved laser welding system that minimizes costs and the likelihood of construction inefficiencies that arise from high powered laser welding.

BRIEF SUMMARY OF THE INVENTION

Responsive to these and other concerns caused by conventional laser welding systems, the present invention provides an improved system for decreasing the costs and structural inefficiencies associated therewith. This invention provides a method of welding workpieces using multiple sources for in tandem pre-heating and welding. The invention is further useful, among other things, for substantially pre-heating the workpieces with a heating unit, to increase the applicability of low-powered laser welding.

More particularly, a first aspect of the present invention concerns a system for welding a plurality of workpieces. The system preferably comprises first and second electrode wheels, and a laser configured to engage and further heat a first portion. The wheels are preferably configured to cooperatively pre-heat the first portion of the workpieces to a temperature at least equal to a predetermined percentage of the melting range of the first portion. The wheels and laser are preferably translatable relative to the workpieces, and cooperatively configured to form a continuous weld between the plurality of workpieces.

A second aspect of the present invention concerns a method of increasing the efficiency of laser-welding a plurality of workpieces. The method preferably comprises the steps of pre-heating a portion of the workpieces to a minimum temperature using a heating unit, further heating the portion with a laser beam until the first portion melts, and cooling the portion to a temperature less than the melting range, so as to allow the portion to re-solidify and form a weld.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment of the invention is described in detail below with reference to the attached drawing figures, wherein.

DETAILED DESCRIPTION OF THE INVENTION

Figure 1:
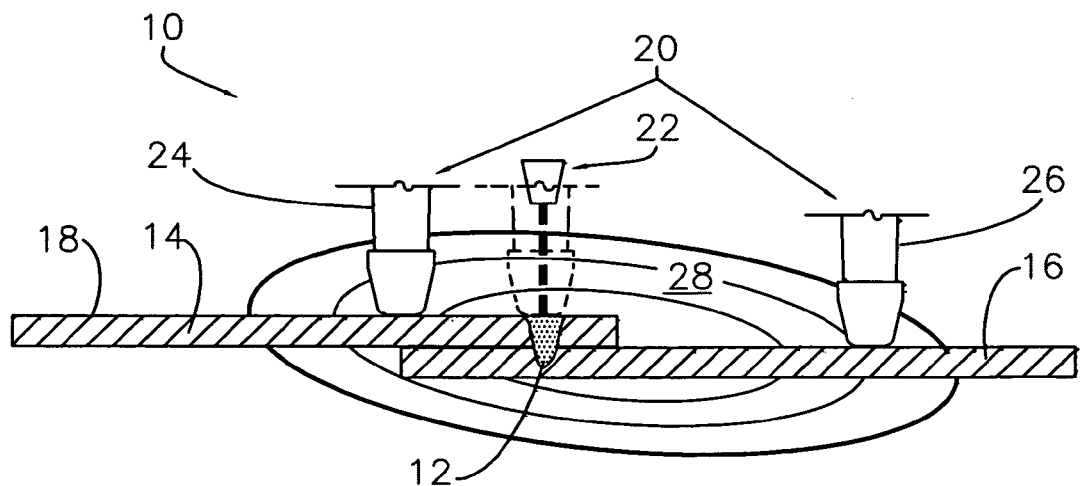
FIG. 1 is a cross-sectional view of a plurality of workpieces in overlap configuration and a welding system in accordance with a preferred embodiment of the present invention, particularly illustrating a spot welding system.

The present invention concerns an improved fusion welding system 10 for welding a plurality (i.e., two or more) of overlapping adjacent workpieces, such as automotive sheet metal and engine cradle parts, to produce a weld 12. In the illustrated embodiments shown in FIGS. 1 through 4, a plurality of two workpieces 14,16 of equal thickness are shown; however, the system 10 may be utilized to weld a greater plurality or structural components having variable thickness. The workpieces may be formed of a wide range of materials including iron alloys, aluminum alloys, magnesium alloys, titanium and molybdenum. As shown in FIG. 1, the positioned workpieces 14,16 present at least one outermost surface 18 that defines in part an outer edge and is exposed to the system 10. To facilitate accessibility, the system 10 preferably presents a single-sided process, in that it engages the workpieces 14,16 along surface 18 only. In this configuration, the workpieces 14,16 are supported on the opposite side by a backing plate or clamping fixture (not shown). Although described herein with respect to workpieces, it is well within the ambit of the present invention for the system 10 to be used in other ways, wherein repair or welding is desired, such as patching an existing structure.

Turning to the configuration of the system 10, a heating unit 20 is provided for heating a portion of the workpieces 14,16 so as to increase the temperature of the portion to a minimum temperature. A welding device 22 is operable to further heat of the portion past the melting range of the portion. The unit 20 and device 22 may be manually controlled, or controlled by electromechanical means (not shown). More preferably, the system 10 is robotically controlled along multi-axes and is programmably adjustable.

In the illustrated embodiments, the preferred heating unit includes a plurality of electrodes 24,26 configured to pass an electric current (not shown) through the portion of the workpieces. The resistivity of the workpieces 24,26 produces radiant and conductive heat energy, and creates a heat-affected-zone (HAZ) 28 that encompasses the soon to be welded portion (see, FIG. 1). It is appreciated by those ordinarily skilled in the art that total resistance is directly proportional to the linear distance between electrodes, and as such, resistance and therefore current flow can be varied by relocating the electrodes. The "pre-heated" portion extends through each workpiece, wherein weld nugget formation is desired (see, FIG. 1).

More particularly, electrodes 24,26 present an electric elevation, so as to produce a potential difference therebetween. For example, the power charged to electrode 24 may be approximately equal to 25 to 100 kVA, as is typically used for spot welding, while electrode 26 is grounded. The heating unit is preferably configured to produce a quantity of heat energy sufficient to heat the portion to a temperature not less than 10%, and more preferably not less than 20% of the melting range for steel or iron alloys, and not less than 30%, and more preferably 50% for aluminum alloys. It is further appreciated that workpieces 14,16 are significantly plasticized at these temperatures, thereby resulting in increased workability and thermal receptivity. Finally, the preferred electrodes 24,26 may be any suitable spot welding electrode, conductive connections, or similar devices, and the current may be a pulsed, alternating or direct current.

As further shown in FIGS. 1 through 4, the preferred device 22 includes a laser 30 operable to engage the outer surface 18 with a laser beam 30a having appropriate power to further heat the portion to a temperature greater than the melting range. As an intended benefit of pre-heating the portion, the laser 30 need not produce a high power output to form the weld 12. As such, a low power laser, i.e. maximum 4 kW, can be utilized for most sheet welding applications of the present invention. The sequence of operations, however, presents a parameter of functionality as the rate of cooling of the pre-heated workpieces 14,16 is directly related to the thermal conductivity of the workpiece material. Thus, so that the focused energy of the laser beam 30a could produce the weld pool by fusion, it must be applied within a maximum period from pre-heating, i.e. 5 s. Where welding is desired at the workpiece 14 electrode 24 interface, the electrode must be removed (as shown by hidden line in FIG. 1) and the laser put in place within this period. After the laser beam 30a is applied, the weld pool is cooled by the surrounding material and atmosphere to solidify and form the weld 12.

While other welding devices, such as arc torches, solid-state, and hybrid welding systems, can be utilized to form the weld 12, it is appreciated by those ordinarily skilled in the art that the laser beam 30a provides one of the most accurate and consistent conventional means for welding. It is also appreciated that the relative cost of high powered laser welding realizes greater cost benefits of pre-heating, when compared to other welding devices 22. Finally, the application of resistance preheat prior to laser welding is further useful for significantly increasing the static strength of the joint. For example, the application of resistance preheat to 1.3 mm thick mild steel and 1.4 mm thick aluminum (AA5754) workpieces prior to laser welding utilizing either a $CO_2$ or Yag laser results in an increase in static strength approximately equal to 1,500 N and 2,500 N, or 15% and 100%, respectively.

Figure 2:
FIG. 2 is a perspective view of a plurality of workpieces in overlap configuration and a welding system in accordance with a preferred embodiment of the present invention, particularly illustrating a translatable system.
Figure 3:
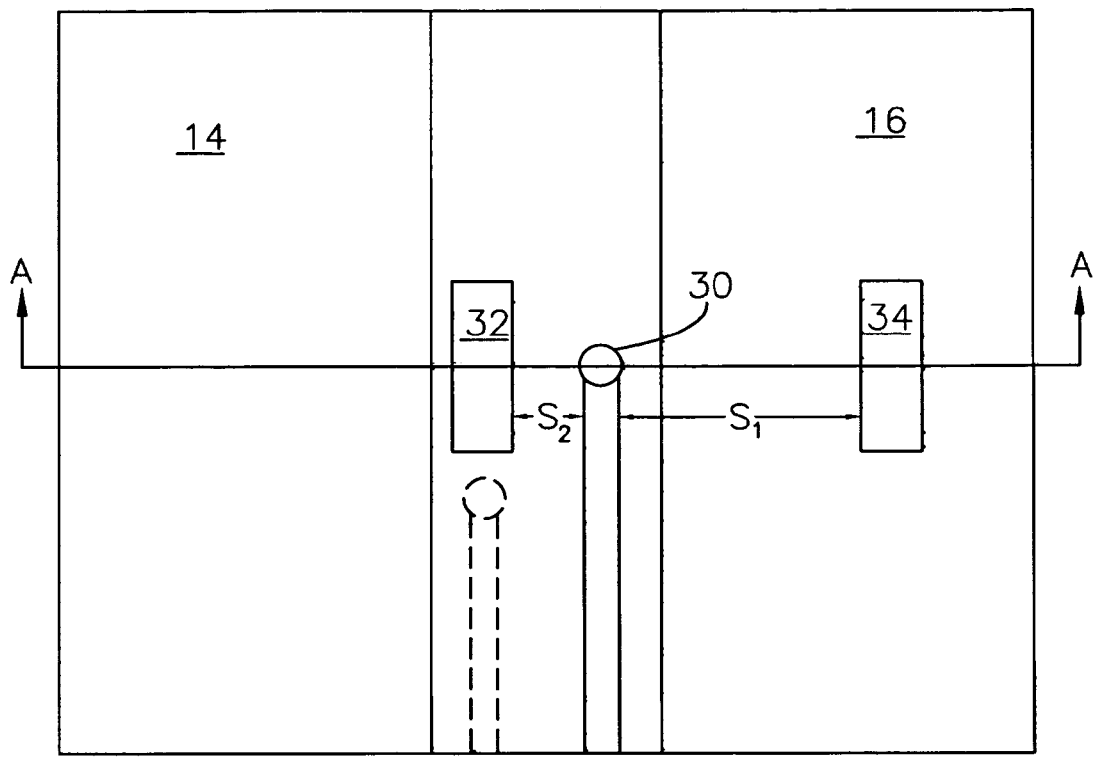
FIG. 3 is top view of the workpieces and a translatable system in accordance with a preferred embodiment of the present invention.
Figure 4:
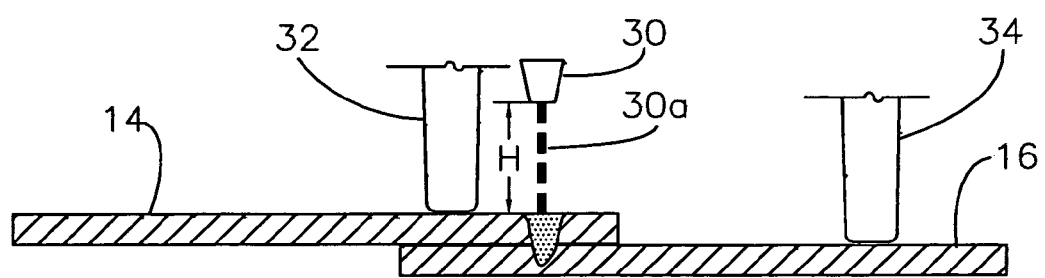
FIG. 4 is a cross-sectional view of the workpieces and system shown in FIG. 3 taken along line A-A.

More preferably, and as shown in FIGS. 2 through 4, the welding system 10 is also translatable with respect to the workpieces 14,16, so as to be capable of producing a continuous or seam weld. In this configuration, the system 10 preferably includes electrode wheels 32,34 that rollingly engage upper and lower workpieces 14,16. Among other factors, wheel placement relative to the laser 30 depends upon the application, available power, and workpiece geometry. A suitable copper alloy wheel electrode, as is typically used in seam welding, may be utilized in this configuration.

Since this is a single-sided process, to sustain the wheel pressure the lower sheet 16 should be equal to or thicker than the upper sheet. It is preferable that the thickness of the upper sheet 14 be less than 3 mm. For example, for upper sheets 14 of thicknesses less than 3 mm, the electrode wheels 32,34 may present roller widths less than or equal to 14 mm, with a supplied power output of 80 kVA (DC). The first wheel 34 may be spaced from the projected weld a distance, $S_1$, within the range of 15 to 50 mm and made to contact the lower worksheet 16. Similar to the alternative electrode 24 locations shown in FIG. 1, the second wheel 32 may precede the laser 30 while contacting the upper workpiece 14 (as shown in FIG. 2, and by hidden line in FIG. 4), or be spaced from the longitudinal center line of the weld a distance, $S_2$, not greater than 5 mm (as shown in FIGS. 3 and 4). It is appreciated that workpiece temperatures at the non-exposed wheel-workpiece interface present maximum initial temperatures for in tandem welding. However, where laser welding is performed intermediate the wheels, the laser beam 30a is absorbed more efficiently by the workpieces 14,16 and generally intercepts the current, thereby resulting in concurrent heating and welding.

A suitable laser 30 to be used in the present invention may include YAG lasers. It is appreciated that these lasers are flexible for beam delivery. It is further appreciated that lower-powered (i.e. <4 kW) lasers and/or faster welding speeds can be utilized, in combination with the heating unit pursuant to the present invention, to weld materials 0.8 mm (steel for automotive applications) to 15 mm (ship steel) in thickness. The laser can be spaced above the surface 18 a distance, H, within the range of 150 to 200 mm and angled between 70° and 90° (i.e., angle between the laser head and vertical axis). The preferred laser 30 may also be a low powered $CO_2$ or fiber laser having an individual or simultaneous processing capacity. Finally, a flow of inert gas, such as Argon, may be directed along the seam at an angle within the range 20° to 60° and at a discharge rate within the range of 10 to 100 L/min.

The laser beam 30a may be produced by a single laser and delivered via fiber optic conduit and articulated robotic arms, in order to work on components of complex shape. The laser beam 30a may also be split into multiple beams configured to concurrently or sequentially act upon the same or different portions of the workpieces to produce a deeper weld or multiple concurrent welds. Finally, a plurality of systems 10 may be interconnected and simultaneously operable, so as to concurrently weld an equal plurality of sets of workpieces.

Thus, a preferred method of welding a plurality of workpieces to produce a weld is presented, and includes the following steps. First, a portion of the workpieces is heated to a temperature at least equal to 10% of the melting range of temperatures of the workpiece, by engaging each workpiece with an electrode and passing an electric current therebetween. More preferably, the portion is heated to 20% of the melting range for steel, and not less than 30% for aluminum alloys. Next, a laser beam engages and further heats the portion past the melting range of the workpiece material to form a weld pool. Where continuous welding is desired, the electrodes and beam are congruently translated. Finally, the molten material is cooled to a temperature less than the melting range and allowed to re-solidify. Multiple laser beams may be split from the initial beam and engage the workpieces either in series or in parallel.

Obvious modifications to the exemplary embodiments and methods of operation, as set forth herein, could be readily made by those skilled in the art without departing from the spirit of the present invention. As used herein, the term "plurality" shall mean two or more. The inventor hereby states his intent to rely on the Doctrine of Equivalents to determine and assess the reasonably fair scope of the present invention as pertains to any system not materially departing from but outside the literal scope of the invention as set forth in the following claims.

What is claimed is:

1. A system adapted for welding a plurality of workpieces cooperatively defining a top outermost surface over a dual heating process, said system comprising:
   a resistance heating unit including first and second spaced electrodes configured to solely engage the top surface, wherein one of said electrodes is positively charged, said electrodes cooperatively present a voltage drop, and cooperatively cause a current flow to be produced within, and a first heat energy to engage the workpieces, when brought into contact with the surface, so as to heat a first portion of the workpieces to a temperature range above a minimum temperature for a heating period; and
   a welding device spaced from the unit, configured to subsequently engage the top surface and generate a second heat energy separate from the first, wherein the second energy is operable to further heat the first portion during the period,
   said unit and device being cooperatively configured to form a weld within said plurality of workpieces, such that the total heat energy that causes the formation of the weld is cooperatively produced by the unit and device.

2. The system as claimed in claim 1,
   said electrodes and workpieces being cooperatively configured to heat the first portion to a temperature at least equal to 10% of the melting range of the first portion.

3. The system as claimed in claim 2,
   said electrode and workpieces being cooperatively configured to heat the first portion to a temperature at least equal to 50% of the melting range of the first portion.

4. The system as claimed in claim 1,
   said second electrode being spaced from the first electrode at least 25 mm.

5. The system as claimed in claim 1,
   said unit and device each being linearly translatable, so as to form a continuous weld.

6. The system as claimed in claim 5,
   said unit including at least one electrode wheel.

7. The system as claimed in claim 1,
   said device including a laser configured to focus at least one laser beam upon the first portion after the unit engages the portion and during the heating period.

8. The system as claimed in claim 7,
   said laser having a power output less than 4 kW.

9. The system as claimed in claim 7,
   said laser being either a YAG or $CO_2$ laser.

10. A system adapted for pre-heating and welding a plurality of workpieces, wherein the workpieces cooperatively present a top outermost surface exposed to the system, said system comprising:
    first and second resistance electrode wheels wherein one of said electrodes is positively charged, are spaced between 15 and 55 mm apart, present a voltage drop therebetween, and are configured to concurrently engage the top outermost surface, and cooperatively cause a current to flow in and heat a first portion of the workpieces to a temperature not less than 10 percent of the melting range of the first portion for a period; and
    a laser configured to produce a laser beam, and engage only the top outermost surface with the beam, so as to further heat the first portion to a temperature greater than the melting range and cause a weld pool to form during the period,
    said electrodes and laser being co-extensively translatable relative to, presenting series engagement with, and cooperatively configured to produce the heat energy that forms a continuous weld pool within the workpieces.

11. A method of increasing the efficiency of laser-welding a plurality of workpieces, wherein the workpieces cooperatively present a top outermost surface exposed to the system, and a melting temperature range, said method comprising the steps of:
    a) engaging the top surface with a resistance heating unit, wherein the unit includes first and second electrodes, wherein one of said electrodes is positively charged such that the electrodes cooperatively present a voltage drop therebetween, and cause an electric current to flow through a portion of the workpieces, so as to heat the portion to a maximum temperature less than the melting range and greater than a minimum heating temperature for a heating period;
    b) engaging the top surface with a laser beam spaced from the unit within the period to further heat the portion after heating the portion with the unit, so as to cause the portion to achieves a temperature greater than the melting range and a molten weld pool to form within the portion; and
    c) cooling the portion to a temperature less than the melting range and allowing the portion to re-solidify and form a weld.

12. The method as claimed in claim 11,
    step (a) further including the steps of linearly translating the unit, step (b) further including the steps of linearly translating the laser beam, and step (c) further including the steps of allowing the formation of a continuous weld.

13. The method as claimed in claim 11, wherein the unit and beam engage the portion in a preceding and trailing configuration, and steps (a) and (b) are performed concurrently.

* * * * *